United States Patent [19]

Marek

[11] Patent Number: 4,587,589

[45] Date of Patent: May 6, 1986

[54] VOLTAGE LIMITING FEED-THROUGH UNIT

[75] Inventor: Alois Marek, Untersiggenthal, Switzerland

[73] Assignee: BBC Brown, Boveri & Company, Limited, Baden, Switzerland

[21] Appl. No.: 591,339

[22] Filed: Mar. 20, 1984

[30] Foreign Application Priority Data

Mar. 21, 1983 [CH] Switzerland .......................... 1515/83

[51] Int. Cl.⁴ .............................................. H02H 3/22
[52] U.S. Cl. ...................................... 361/56; 361/119; 361/127
[58] Field of Search .................... 361/56, 91, 118, 119, 361/126, 127, 111; 333/243, 12, 13, 81 A, 17 L, 17 M, 32, 226, 225, 207, 260; 338/21, 216, 20, 220

[56] References Cited

U.S. PATENT DOCUMENTS

| | | | |
|---|---|---|---|
| 3,711,794 | 1/1973 | Tasca et al. | 361/56 X |
| 3,777,219 | 12/1973 | Winters | 361/111 X |
| 3,821,686 | 6/1974 | Harnden, Jr. | 361/56 X |
| 3,863,111 | 1/1975 | Martzloff | 361/119 |
| 4,021,759 | 5/1977 | Campi | 361/56 X |

Primary Examiner—Harry E. Moose, Jr.
Attorney, Agent, or Firm—Burns, Doane, Swecker & Mathis

[57] ABSTRACT

In a feed-through unit of a conductor (2) through an opening in a conducting wall, the conductor together with shunt elements connected between the conductor and the wall—which shunt elements have a first and a second contact surface with a conducting coating—forms a rotationally symmetrical or mirror symmetrical configuration which completely or substantially closes the opening.

In order to guarantee an even thermal stress on the individual shunt elements, the latter are so formed that the first contact surface and the second contact surface run parallel and the shunt element is located in each case essentially between the two contact surfaces. Several shunt elements can be arranged in shunt rows, whereby successive shunt elements are seriated either directly or separated by conducting intermediate layers. When a conductor designed as a strip conductor and cuboid shunt elements are used, shunt rows can also be connected in parallel and arranged directly adjacent to one another with intermediate layers extending transversely through the parallel shunt rows.

5 Claims, 4 Drawing Figures

VOLTAGE LIMITING FEED-THROUGH UNIT

The invention concerns voltage limiting feed-through units; in these, a conductor is fed through an opening in a conducting wall and at least one shunt element in Varistor material is so arranged between the conductor and the wall that the opening is at least essentially closed by it.

Voltage limiting feed-through units permit the protection of sensitive electronic devices from overvoltages transmitted by supply lines. They are particularly suitable for protection against steep voltage pulses.

A voltage limiting feed-through unit axisymmetrically designed with a cylindrical conductor and at least one cylindrical shunt element is known (U.S. Pat. No. 3,711,794), in which feed-through unit the shunt element is a disc with a central hole through which the conductor is fed; the boundary surface of the central hole serves as a first contact surface, which is electrically connected to the conductor and the outer, peripheral boundary surface of the disc serves as a second contact surface, which is electrically in contact with the wall.

In such an arrangement of the contact surfaces, the shunt element is unevenly stressed both in normal operation, particularly if the conductor carries an alternating voltage and on the occurrence of overvoltages because the electrical field strength and the current density increases from the outer to the inner boundary surface. In particular, the region adjacent to the inner boundary surface can be strongly heated and damaged.

The invention is intended to aid in this respect. The invention attains the objective of creating a voltage limiting feed-through unit in which the potential in the shunt elements is so formed that the equipotential surfaces run at least approximately parallel to the contact surfaces and therefore the field strength is approximately constant over the volume of the shunt elements.

The advantage attained by the invention are to be seen in that there are no regions in the shunt elements which carry an above average load, in which the varistor material can be prematurely damaged or destroyed and, thus, the function of the shunt elements adversely affected. The life and reliability of the generic type of feed-through unit is substantially improved by this means. In addition, the shunt elements designed in accordance with the invention offer the advantage that they can be seriated, by which means the feed-through units in accordance with the invention can be adapted in a simple and economical manner to various requirements with respect to the limiting voltage still tolerable in terms of the installation to be protected.

The invention is described in more detail below using drawings representing only models. In these:

Corresponding parts are indicated by the same numbers in all the figures.

Figure 1:
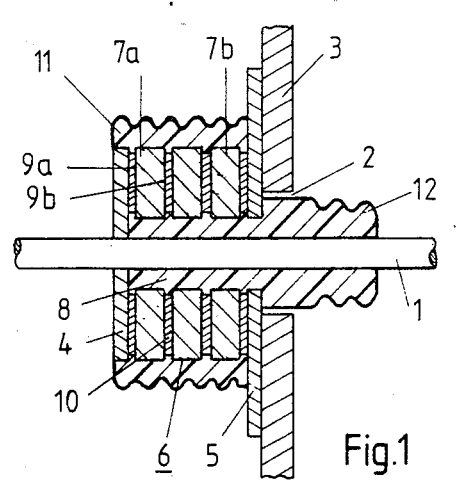
FIG. 1 shows an axial longitudinal section through a voltage limiting feed-through unit in accordance with a first model of the invention.
Figure 2:
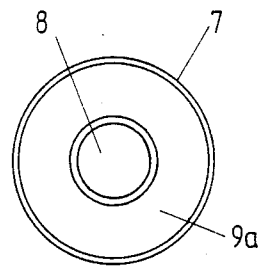
FIG. 2 shows a top view of a shunt element in accordance with the first model of the invention.
Figures 3, 4:
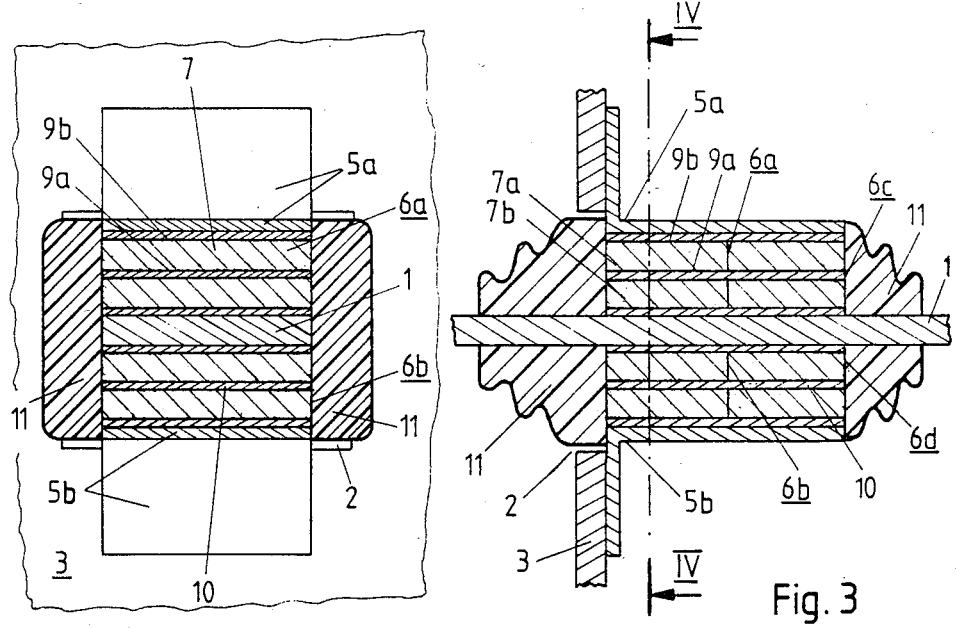
FIG. 3 shows a longitudinal section through a voltage limiting feed-through unit in accordance with a second model of the invention and FIG. 4 shows a cross-section through the voltage limiting feed-through unit in accordance with the second model of the invention along IV—IV in FIG. 3.

In accordance with the first embodiment of the invention, a cylindrical conductor 1 is fed through a circular opening 2 in an electrically conducting wall 3 of, for example, a grounded casing. Located between an annular continuation 4 of the conductor 1 and a likewise annular contact plate 5 is a shunt row 6, which is built up from indentical cylindrical shunt elements each provided with a central hole 8 and a varistor material of known type, preferably a sintered body consisting substantially of zinc oxide. Each shunt element 7 has, on each of the annular end surfaces, a likewise annular contact surface 9a or 9b with a conducting coating. The shunt elements 7 are so arranged in a row that the mutually facing contact surfaces of successive shunt elements are only separated by a comparatively thin intermediate layer 10 of conducting material, for example, the soldering or diffusion welding medium connecting the shunt elements, which connecting medium can, however, also be omitted if mechanical strength and good contact between the shunt elements are otherwise guaranteed.

In this manner, shunt rows 6 of different lengths can be built up from similar shunt elements 7 in a simple and low cost manner, which shunt rows are matched in each case to the requirements with respect to the still tolerable limiting voltage of the installation to be protected. A shunt row built up, in the manner described, from several shunt elements also has the further advantage relative to an identically long shunt in one piece, that possible irregularities in the voltage drop due to inhomogeneities in the varistor material are evened out by the intermediate conducting layers (the conducting coating of the contact surfaces being sufficient for this purpose).

The shunt row 6 is externally surrounded by an insulating cover 11 which extends from the extension 4 of the conductor 1 to the contact plate 5. The conductor 1 is likewise separated from the shunt row 6 and from the contact plate 5 and wall 3 by an insulating part 12. The insulating cover 11 and the insulating part 12 have grooves 13 on their surfaces which lengthen potential leakage paths. They can, for example, consist of cast resin.

In the second embodiment of the invention, a conductor 1 designed as a strip conductor, is fed through a rectangular opening 2 in a conducting wall 3. Located between the conductor 1 and each of the contact plates 5a, 5b are two parallel shunt rows 6a, 6c or 6b 6d, which consist of cuboid shunt elements 7 which have contact surfaces 9a, b located on opposite boundary surfaces. Located between the mutually facing contact surfaces of successive shunt elements 7 are conducting intermediate layers 10 which preferably run trasversely through the parallel shunt rows 6a, 6c or 6b, 6d and by this means ensure an evening-out of potential between the rows.

The construction described is particularly favorable in that different voltage limiting feed-through units can be compactly constructed by combining identical shunt element, which feed-through units are matched to the given requirements not only with respect to the limiting voltage but, independent of the latter, with respect to the possible energy intake because in addition to the length of the shunt rows, the volume of the active part can also be adjusted in a simple manner by parallel connection and parallel arrangement of shunt rows.

The conductor rows 6a, b, c, d are surrounded by an insulating cover 11, consisting, for example, of cast resin, the surface parts of the cover extending from the conductor 1 to the contact plate 5 again having grooves to lengthen potential leakage paths.

Voltage limiting feed-through units constructed in accordance with the invention are particularly suitable for use in conductors which serve to transmit energy or information at frequencies which are not too high, i.e. frequencies up to approximately 1 MHz, because the losses caused by the capacity of the feed-through unit in the corresponding frequency ranges are negligible or at least tolerable.

I claim:

1. Voltage limiting feed-through unit of axisymmetrical design comprising:

a cylindrical conductor for passing through an opening of an electrically conductive wall, said conductor being insulated from said wall opening;

plural identical shunt elements serial aligned to form a shunt row, each shunt element formed of a varistor material with a central hole through which the conductor extends, each shunt element having first and second parallel contact surfaces with conductive coatings on said surfaces;

a first of said shunt elements having its first contact surface in an electrically conductive connection to said conductor;

a last of said shunt elements having its second contact surface in a location for an electrically conductive connection to said wall;

the shunt element adjacent the first shunt element having its first contact surface in electrically conductive relationship with the second contact surface of the first shunt element, and each successive shunt element thereafter having its first contact surface in electrically conductive relationship with the second contact surface of the preceding shunt element; and isolating means separating the contact surfaces common to two successive shunt elements from the cylindrical conductor and the electrically conductive wall.

2. Voltage limiting feed-through unit according to claim 1, wherein the conductor has one annular extension, against which the first contact surface of the first shunt element of the shunt row is in an electrically conductive relationship.

3. Voltage limiting feed-through unit of mirror-symmetrical design comprising:

a strip conductor for passing through an opening of an electrically conductive wall and having two flat sides constituting contact surfaces, said conductor being insulated from said wall opening;

plural identical shunt elements of varistor material each in the shape of a cuboid located on each side of said conductor in a serial arrangement, each shunt element having first and second parallel contact surfaces with conductive coatings on said surfaces;

a first shunt element on each side of said conductor having its first contact surface in an electrically conductive connection with a contact surface of said conductor;

a last of said shunt elements having its second contact surface in a location for an electrically conductive connection to said wall;

each of the shunt elements adjacent each of said first shunt elements having its first contact surface in electrically conductive relationship with the second contact surface of each of the first shunt elements, and each successive shunt element on each side of said conductor having its first contact surface in electrically conductive relationship with the second contact surface of a preceding shunt element on a respective side of said conductor; and isolating means separating the contact surfaces common to two successive shunt elements from said strip conductor and the electrically conductive wall.

4. Voltage limiting feed-through unit according to claim 3, wherein several identical parallel connected serial arrangements of shunt elements are located on each side of the conductor.

5. Voltage limiting feed-through unit according to claim 4 wherein on each side of the conductor there is at least one layer of electrically conducting material extending parallel to the conductor and transversely through several shunt rows connected in parallel, which layer connects adjacent shunt elements in each of the serial arrangements of shunt elements.

* * * * *